United States Patent
Wallin et al.

(10) Patent No.: US 11,067,129 B2
(45) Date of Patent: Jul. 20, 2021

(54) ROLLING BEARING FOR REFRIGERANT COMPRESSOR

(71) Applicant: Aktiebolaget SKF, Gothenburg (SE)

(72) Inventors: Hans Wallin, Cape Coral, FL (US); Rudolf Hauleitner, Steyr (AT); Guillermo Enrique Morales Espejel, Ijsselstein (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/574,239

(22) Filed: Sep. 18, 2019

(65) Prior Publication Data

US 2021/0079953 A1 Mar. 18, 2021

(51) Int. Cl.
| | |
|---|---|
| *F16C 19/08* | (2006.01) |
| *F16C 19/49* | (2006.01) |
| *F16C 33/44* | (2006.01) |
| *F16C 33/66* | (2006.01) |
| *B21B 27/06* | (2006.01) |
| *F16C 19/46* | (2006.01) |

(52) U.S. Cl.
CPC .......... *F16C 33/6681* (2013.01); *F16C 19/08* (2013.01); *F16C 19/46* (2013.01); *F16C 33/44* (2013.01); *F16C 33/664* (2013.01); *F16C 33/6688* (2013.01); *F16C 2204/60* (2013.01); *F16C 2206/56* (2013.01); *F16C 2206/60* (2013.01); *F16C 2208/04* (2013.01); *F16C 2208/36* (2013.01); *F16C 2360/00* (2013.01)

(58) Field of Classification Search
CPC ........ F16C 19/08; F16C 19/49; F16C 33/303; F16C 33/6681; F16C 33/44; F16C 33/664; F16C 33/6688; F16C 2204/06; F16C 2204/60; F16C 2206/60; F16C 2206/56; F16C 2208/36; F16C 2360/00; F16C 2208/04; F04D 29/06; F04D 29/049; B21B 27/07
USPC ......... 384/462, 467, 474, 492, 494; 415/229
See application file for complete search history.

(56) References Cited

U.S. PATENT DOCUMENTS

| | | | |
|---|---|---|---|
| 6,176,092 B1 | 1/2001 | Butterworth | |
| 7,172,343 B2 * | 2/2007 | Kinno | C23C 14/0605 384/492 |
| 9,879,162 B2 | 1/2018 | Synnestvedt | |
| 9,879,164 B2 | 1/2018 | Kujak | |
| 2013/0170943 A1 * | 7/2013 | Jonsson | F16C 19/54 415/1 |

(Continued)

FOREIGN PATENT DOCUMENTS

| | | | | |
|---|---|---|---|---|
| CN | 100398861 C | * | 7/2008 | .......... F16C 33/4605 |
| CN | 201448241 U | * | 5/2010 | |
| CN | 205025807 U | * | 2/2016 | |

(Continued)

*Primary Examiner* — Marcus Charles
(74) *Attorney, Agent, or Firm* — Garcia-Zamor Intellectual Property Law; Ruy Garcia-Zamor; Bryan Peckjian

(57) ABSTRACT

A rolling bearing having an inner raceway and an outer raceway and a plurality of rolling elements arranged therebetween. The rolling bearing is media-lubricated or oil-free lubricated. The lubricant forms an elasto-hydrodynamic lubricant film between the rolling elements and the raceways. At first use of the rolling bearing, at least one surface of the rolling bearing is coated with a protective fluid, preferably an oil-based preservative fluid. Also, a refrigerant compressor having such a rolling bearing.

20 Claims, 1 Drawing Sheet

(56) References Cited

U.S. PATENT DOCUMENTS

2018/0128522 A1* 5/2018 Hauleitner ............ F25B 31/004
2019/0186541 A1* 6/2019 Hauleitner ............. F16C 33/34

FOREIGN PATENT DOCUMENTS

| | | | | | |
|---|---|---|---|---|---|
| CN | 206268075 | U | * | 6/2017 | |
| CN | 105436207 | B | * | 7/2018 | ............. B21B 35/06 |
| CN | 207795578 | U | * | 8/2018 | |
| DE | 4305289 | A1 | * | 9/1993 | ............ F16C 19/163 |
| FR | 3033607 | A1 | * | 9/2016 | .............. F16C 21/00 |
| GB | 2514271 | B | | 9/2016 | |
| JP | 2004290153 | A | * | 10/2004 | ..... A01K 89/011223 |
| JP | 2017110527 | A | * | 6/2017 | |
| WO | WO-9117345 | A1 | * | 11/1991 | .......... F04C 29/0021 |
| WO | WO-2010134602 | A1 | * | 11/2010 | ......... C04B 35/4885 |
| WO | WO-2012062642 | A1 | * | 5/2012 | ............ F16C 19/541 |
| WO | WO-2013157485 | A1 | * | 10/2013 | .......... F16C 33/4605 |
| WO | 2014117011 | A1 | | 7/2014 | |
| WO | 2014144554 | A1 | | 9/2014 | |
| WO | 2014144558 | A1 | | 9/2014 | |
| WO | 2015142825 | A1 | | 9/2015 | |
| WO | 2016060873 | A1 | | 4/2016 | |
| WO | 2016075541 | A1 | | 5/2016 | |
| WO | WO-2016068216 | A1 | * | 5/2016 | ............ C10M 111/02 |
| WO | WO-2017068666 | A1 | * | 4/2017 | ..... A01K 89/011222 |
| WO | 2018038926 | A1 | | 3/2018 | |
| WO | 2018089090 | A1 | | 5/2018 | |

* cited by examiner

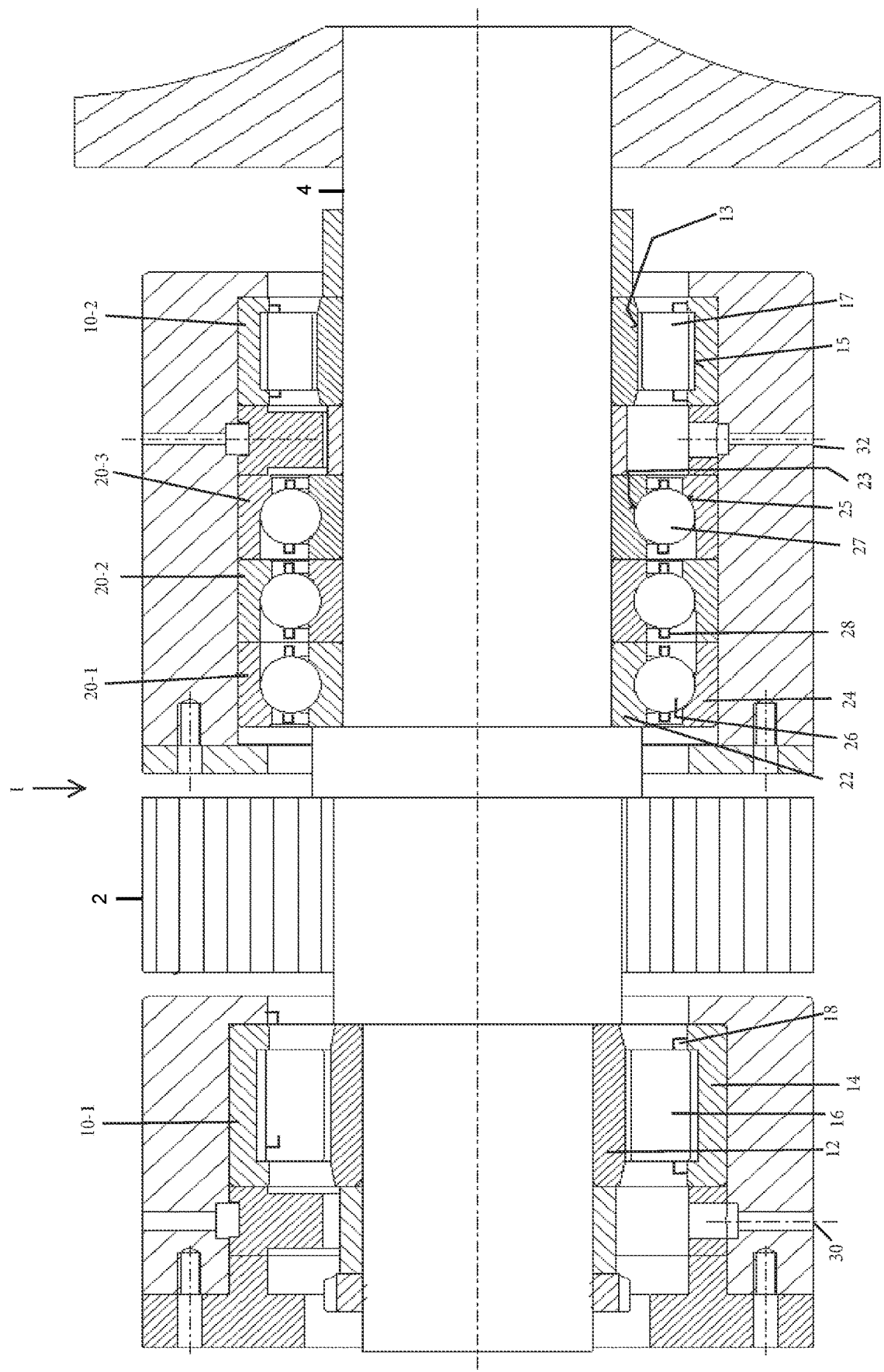

ROLLING BEARING FOR REFRIGERANT COMPRESSOR

FIELD OF THE INVENTION

The present invention relates to a rolling bearing, particularly a hybrid rolling bearing according to the preamble of patent claim 1, as well as to a refrigerant compressor comprising such a hybrid rolling bearing.

BACKGROUND OF THE INVENTION

Rolling bearings and particularly hybrid rolling bearings are often used in very demanding environments, for example in applications with reduced lubrication conditions and/or in high speed and/or high temperature applications. In hybrid roller bearings, bearing rings and roller elements are made from different materials. Usually the rings are made from steel and the rolling elements are made from a ceramic material. With the increased severity of the working conditions, e.g. heavier loads in combination with higher temperatures, thinner lubrication films and/or poor lubrication conditions the bearing components can suffer from surface initiated fatigue, so called micropitting. Even if micropitting is not necessarily a primary failure mode, it can facilitate/accelerate the appearance of other failures like indentation, surface initiated spalling and seizure.

Thus, micropitting is one of the mechanisms responsible for life-limiting bearing wear. One approach to mitigate the effects of micropitting is to ensure that the rolling contact surfaces in a bearing are always separated by a lubrication film of sufficient thickness.

This is not possible in ultra-thin lubrication film thickness (UTFT) applications. UTFT applications in rolling bearings refer to conditions when the separation of surfaces by a lubricating film is compromised by:

low viscosity of the lubricant i.e. fluids with a dynamic viscosity in the order of 1 cSt and below (lower than 1 cSt) and/or lubricant starvation i.e. a condition where the available lubricant layer in the rolling contact inlet cannot guarantee fully flooded conditions in the bearing.

In both conditions the overall lubricant layer thickness at the contact surfaces is limited to 300 nm or less. This can happen because the bearing is lubricated with grease (limited lubricant release) or the lubricant evaporates before reaching the contact (volatile fluids) or there is limited lubricant supply by the lubrication system.

Additionally, many of these UTFT applications use media lubrication, like pure refrigerant lubrication, oil-refrigerant mixture lubrication, fuels (kerosene, diesel, gasoline, natural gas, alcohols) lubrication, and/or grease combined with media lubrication. Water lubrication is excluded. For pure refrigerant lubrications, the resulting lubricant film thickness is even significantly less than 300 nm, more often less than 100 nm, typically in the range of 30 nm.

The main failure mode of these rolling bearings is wear assisted by corrosion. Wear due to solid-to-solid contact enhanced by corrosion can modify the raceway profile, increase the clearance and concentrates local stresses that could develop spalls. Another important failure mode of these bearings is solid contamination. Since these applications work with very thin film thicknesses (e.g. less than 300 to 200 nm) any solid particle (debris, sand, oil soot, etc.) even the very small ones can produce damage in the contact surfaces and can modify the topography disrupting the film build-up capability of the original surface. Excessive contamination can also generate high friction forces that will hinder/block the rotation of the bearing and can produce fractures in the cage or seizure in the raceways and rolling elements.

Therefore, it has been proposed in the state of the art to employ surface engineering techniques and to provide a roughness for the raceways of the bearing rings and a roughness of the rolling elements which are as equal as possible, in order to reduce micropitting and improve the wear and fatigue life of bearings. This is based on the understanding that a rougher rolling contact surface imposes load micro cycles on a smoother, opposing rolling contact surface, in the presence of sliding and in the absence of full-film lubrication. Disadvantageously, in practice, even in ordinary steel-steel bearings, the raceways of a bearing are generally somewhat rougher than the rolling elements. In hybrid rolling bearings the difference between the roughnesses is even greater.

It has been further suggested that for providing a hybrid rolling bearing which has a prolonged service life and an improved corrosion and micropitting resistance even after running-in, at least one of the rolling elements of the hybrid rolling bearing has an increased surface RMS roughness $Rq2,N$, which is significantly higher than the RMS roughnesses $Rq2,i$ of the remaining rolling elements. The higher $Rq2,i$ roughness value of the at least one rolling element allows for an increased wear when the at least one rolling element with the increase roughness contacts the raceways. Even if increased wear should in generally be avoided, the intended wear according to the invention smooths out indentations in the raceways which occur during the service life of the bearing. This in turn reduces the overall corrosion of the hybrid bearing and prolongs the service life of the bearing.

However, it has disadvantageously proven that during transport or mounting of the rolling bearing the sophisticatedly machined surfaces may be damaged and/or the intentionally engineered roughness of the surfaces may be deteriorated due to e.g. mishandling or corrosion influences. This in turn deteriorates the corrosion and micropitting resistance of the bearing and eventually its service life.

It is therefore object of the present invention to provide a rolling bearing, particularly a hybrid rolling bearing, which may be used in ultra-thin lubrication film thickness applications, particularly in a refrigerant compressor device, and which has an improved and protected corrosion and micropitting resistance.

BRIEF SUMMARY OF THE INVENTION

This object is solved by a hybrid rolling bearing according to patent claim 1 and a refrigerant compressor comprising such a bearing.

In the following a rolling bearing, particularly a hybrid rolling bearing, comprising an inner raceway and an outer raceway and a plurality of rolling elements arranged therebetween is proposed. The rolling bearing may be a hybrid ball bearing or a hybrid roller bearing having balls or rollers, respectively, as rolling elements, wherein, the hybrid rolling bearing has an outer raceway and an inner raceway made from bearing steel, and rolling elements—balls or rollers—made from a ceramic material.

For providing a rolling bearing which has a prolonged service life and an improved corrosion and micropitting resistance even after running-in, the inventors have found that it is crucial for rolling bearings, which are, in use, media-lubricated or oil-free lubricated, wherein the lubricant forms an elasto-hydrodynamic lubricant film between the rolling elements and the raceways, to avoid any deteriorating influences to the rolling bearing even before first use. Consequently, a rolling bearing is proposed wherein, at first use of the rolling bearing, at least one surface of the rolling bearing is coated with a protective fluid, preferably an oil-based preservative fluid. The protective fluid covers at least one of the functional surfaces of the bearing and protects the bearing from any chemical attack. Thereby, the protective fluid ensures that the surface of the bearing is, as much as possible, undamaged before the bearing is used for the first time.

Thereby it is particularly advantageous, if the protective fluid coating is water/humidity repellent or even hydrophobic, so that water or humidity does not get into contact with the media, which is used for lubrication. Often lubricants are used in media lubricated bearing applications which have an even higher corrosive influence when being in contact with water/moisture. Consequently, any water/moisture exposure should be avoided, which may be achieved by coating the bearing with a water repellant od hydrophobic coating fluid.

According to a further preferred embodiment, the media lubricated bearing is lubricated by pure refrigerant or a refrigerant-oil mixture. Refrigerants and refrigerant-oil mixtures can be aggressive and/or easily break down and form acids. In combination with water/humidity such refrigerant substances are even more aggressive. Consequently, the bearing operating in refrigerant lubricated environments need to be extra protected, which is done by the additional protective fluid coating. Any small damage to the surfaces during mounting or transport may result in a shortened life time. The protective fluid coating may avoid such damages and thereby increase the service life of the bearing even in refrigerant lubricated environments. Usually, refrigerants such as R134a, R1233zd, R1234ze, or R515B may be used.

A further challenge with the media lubricated bearings is that the medium often provides only an insufficient lubrication film. Consequently, the additional protective fluid coating is advantageous, for rolling bearings, particularly hybrid rolling bearings, which are lubricated by means of an ultra-thin lubrication film arranged between the rolling elements and the raceways, wherein the lubrication film thickness is less than 300 nm, preferably less than 100 nm, most preferred less than 30 nm.

Advantageously, the protective fluid coating with anticorrosion additives is left on the bearing in use, as the substances do not react with the media-lubricant/refrigerant. To the contrary, the protective fluid coating may protect the bearing surfaces from the corrosive influence of the media-lubricant/refrigerant by maintaining an additional protective coating on the bearing surface, which in turn enhances the bearing performance. A further advantage is that the additional coating may increase the thickness and/or continuity of the lubrication film in ultra-thin lubrication film applications.

According to a further preferred embodiment, the protective fluid is a preservative fluid with anticorrosion additives. The anticorrosion additives bond physically or chemically to the bearing surface and protect the bearing from deteriorating influences such as chemical attacks.

Such an anticorrosion additive or the protective fluid itself may be a polar substrate with polar heads and non-polar tails, wherein the polar heads are adapted to bond to the bearing surface and the non-polar tails prevent elements to come into contact with the bearing surface. The polar substances have the further advantage that the physical and chemical properties of the polar substance support that the protective fluid coating is reestablished, in case the coating is washed off the bearing to some extent.

In general, the mechanism of these anticorrosion additives is relatively simple. The anticorrosion additives are molecules with long alkyl chains and polar groups that can be adsorbed on the metal surface forming densely packed, hydrophobic layers. The adsorption mechanism can base on a physical or chemical interaction of the polar anticorrosion additive with the metal surface.

Advantageously, the polar substrate is a detergent, a dispersant or an inhibitor, wherein the preservative fluid preferably comprises overbased sulfonates, amides, imides and/or Zn-naphentate.

It is known to use e.g. petroleum sulfonates, which are by-products at the production of white oils by treatment with oleum. The resulting acid tar contains long chain alkylarylsulfonic acids that can be neutralized with lyes. Sodium sulfonates with low molecular weights (below approx. 450) are typically used as low-priced emulsifiers and detergents with additional anticorrosion properties in water based metal working fluids, engine oils and rust preventatives. Sulfonates with higher molecular weights distinguish as highly efficient corrosion inhibitors especially when based on divalent cations like calcium, magnesium and barium. The importance of the barium compounds is going to decrease constantly due to toxicological and ecotoxicological concerns.

Further, synthetic alkylbenzene sulfonates may be used, preferably due to their higher and more constant quality. They are reaction products of specifically designed monoalkylbenzenesulfonic acids (typically C24 alkyl groups) and dialkylbenzenesulfonic acids (typically two C12 alkyl groups) with alkaline and earth alkaline metal hydroxides.

A special group of synthetic sulfonates are the dinonylnaphthenesulfonates.

Beside the neutral or only slightly basic sulfonates, overbased sulfonates with high alkaline reserve (TBN 100 to 400 mg KOH g-1) play an important role. They exhibit detergent properties and can neutralize acidic oxidation products.

Further, many different long-chain carboxylic acid derivatives may be used, wherein the carboxylic group acts as polar part that can easily be adsorbed on the metal surface.

Examples are e.g. lanolin (wool fat) and salts of the lanolin fatty acid mostly in combination with sulfonates or oxidized paraffins, which have a high polarity because of the high content of hydroxy and oxo carboxylic acids.

Zinc naphthenates may especially be used in lubricating greases.

Alkylated succinic acids, their partial esters and half amides are also known as highly efficient, not emulsifying anticorrosion additives even at very low treat rates of 0.01 to 0.05%.

4-Nonylphenoxyacetic acid and derivatives have a similar performance.

Another wide spread group are amides and imides as reaction products of saturated and unsaturated fatty acids with alkylamines and alkanolamines. The most known product of this type is N-acylsarcosine that shows a strong synergistic effect with imidazoline derivatives. Additionally these additives have good water-displacing properties.

Moreover, some special amine salts of mono- or dialkylphosphoric acid partial esters exhibit excellent anticorrosion properties in addition to their highly efficient antiwear properties.

Alternative or additionally, vapor phase corrosion inhibitors (VCis) may be used, particularly for closed systems. These substances have a high affinity to metal surfaces and relatively high vapor pressure to guarantee their availability on parts that are not steadily in direct contact with the lubricant. The mostly used product group for this application are amines. Morpholine, dicyclohexylamine and diethanolamine have proved to be highly efficient for that purpose. Because of toxicological concerns that refer mainly to the nitrosamine forming potential of secondary amines, these products are going to be partly substituted by tertiary amines like diethanolmethylamine and similar products. Another group of oil soluble VCis are low molecular weight carbonic acids (n-C8 to n-C10).

According to a further preferred embodiment, the bearing is an angular contact ball bearing with contact angles between 100 and 40°, particularly between 15° and 30° degrees.

The bearing may also comprise more than one row of rolling elements, or may be arranged in sets e.g.: pairs of bearings in back-to-back arrangement or front-to-front arrangement. In case the bearings are also angular contact ball bearings it is further preferred that the contact angles are identical. Alternatively, the contact angles may also be different, where particularly the contact angle of a first of the two ball bearings is between 10 to 20° and the contact angle of the second of the two ball bearings is between 21 to 35°.

If the bearings are arranged in pairs it is further preferred that the two bearings are configured to provide an axial clearance with zero measuring and zero mounting loads, wherein the axial clearance is between −5 and 40 μm, if the inner diameter of the inner ring is smaller or equal to 80 mm, the axial clearance is between −5 and 50 μm, if the inner diameters is greater than 80 mm and smaller than or equal to 180 mm and, the axial clearance is between −5 and 70 μm, if the inner diameters is greater than 180 mm. Alternatively, the axial clearance may be defined based on the pitch diameter of the rolling elements so that, the axial clearance is between −5 and 40 μm, if the pitch diameter of one of the two bearings is smaller or equal to 100 mm, the axial clearance is between −5 and 50 μm, if the pitch diameter of one of the two bearings is greater than 100 mm and smaller than or equal to 200 mm and, the axial clearance is between −5 and 70 μm, if the pitch diameter of one of the two bearings is greater than 200 mm.

Thereby the clearance is determined before the first use of the bearings. It is further preferred that the two rolling bearings are paired forming a synchronized set.

According to a further preferred embodiment the rolling bearing is configured for high rotation speeds between 2500 and 25000 rpm or ndm-values being between 500000 and 1500000 mm/60 s, wherein the ndm-value is the multiplication result of the rotation speed and the pitch diameter.

In case the roller bearing is a hybrid roller bearing, it is further preferred that at least one of the rolling elements of the hybrid rolling bearing has an increased surface RMS roughness Rq2,N, which is significantly higher than the RMS roughnesses Rq2,i of the remaining rolling elements. The higher Rq2,i roughness value of the at least one rolling element allows for an increased wear when the at least one rolling element with the increase roughness contacts the raceways. Even if increased wear should in generally be avoided, the intended wear according to the invention smooths out indentations in the raceways which occur during the service life of the bearing. This in turn reduces the overall corrosion of the hybrid bearing and prolongs the service life of the bearing.

A further advantage of the at least one rolling element with the increased roughness is that contamination particles may be received within the rough surface of the at least one rolling element. Thereby, contamination particles, which are known to damage the raceways of the rings and/or rolling elements, may be filtered out, which also increases the wear and corrosion resistance of the bearing.

Thereby it has been proven as advantageous, if the increased RMS roughness Rq2,N of the at least one rolling element is 10 to 25 times higher than the RMS roughnesses Rq2,i of the remaining rolling elements. Such a high roughness allows for excellent smoothing results.

According to a further preferred embodiment, the increased roughness Rq2,N of the at least one rolling element is higher than the roughness Rq1 of the raceways. It is further preferred that the roughness of the remaining rolling elements is lower than the roughness of the raceways, wherein the roughness of the raceways Rq1 for hybrid ball bearings is 2 to 5, preferably 2.5 to 4, times higher than the roughness Rq2 of the remaining balls, and/or the roughness of the raceways Rq1 for hybrid roller bearings is 1.2 to 4, preferably 1.5 to 3, times higher than the roughness Rq2 of the remaining rollers.

In contrast to the latest efforts to provide hybrid rolling bearings having substantially the same roughness values for raceways and rolling elements, the inventors have surprisingly found that micropitting and corrosion induced wear of a hybrid rolling bearing may be significantly reduced if the roughnesses of the contacting surfaces of the hybrid rolling bearing, particularly in mint conditions, is engineered to be within the above mentioned predefined boundaries.

By providing a hybrid rolling bearing being engineered to have the above defined parameters, the ceramic rolling elements reduce boundary frictions and optimize running-in. Further in poor lubrication and contamination conditions, the proposed ceramic rolling elements suppress the damage mechanism. In addition, the tight control of the composed roughness helps in the build-up of lubrication films and the improvement of running-in as well as in the build-up of the protective fluid coating.

According to a further preferred embodiment the rolling bearing has an osculation Φ, which ranges between 1.02 and 1.1, wherein Φ is defined as $$\Phi = \frac{2r_{i,e}}{D_w},$$

with $r_{i,e}$ being the raceway radius of the inner raceway or the outer raceway, and $D_w$ being the diameter of the rolling element. The proposed osculation gives a balance between low friction forces at the surface and high contact stresses, so bearing life is optimized.

It is further advantageous, if at least one component raceway of the proposed rolling bearing, e.g. raceway and/or the rolling element, is made from a hardened corrosion-resistant steel, having a corrosion resistance with a pitting potential of at least 25 mV higher than the stainless steel reference (AISI 440C) according to ASTM G61-86. Additionally or alternatively, the used steel has an after-heat-treatment hardness of ≥58 HRC and/or a fracture toughness of at least 14 MPa $m_2$ (see ASTM-E399-12).

In case the rolling bearing is a hybrid rolling bearing, it is preferred that at least one rolling element of the hybrid rolling bearing is made from silicon nitride (Si3N4). This, in combination with the selected corrosion-resistant properties of the above mentioned steel, allow for low wear development in the hybrid rolling bearing, since in this case wear is dependent on the steel hardness and the chemically aggressiveness of the environment (corrosion assisted wear).

According to a further preferred embodiment, the rolling elements of the proposed rolling bearing are guided by means of a cage, which is preferably made from a fiber-enforced material, preferably from a glass-fiber enforced PEEK or a carbon fiber material. The fiber-enforced material of the cage prevents cage fracture in heavy contamination environment.

Preferably, the cage has at least one cage pocket which is adapted to accommodate at least one rolling element, wherein the at least one cage pocket has a toroidal shape. The toroidal shape of the cage pocket may support the performance of the bearing under poor lubrication conditions.

All these features alone or in combination ensure a long duration of the rolling bearing, particularly the hybrid rolling bearing, even in the specified conditions of ultrathin lubrication film thickness conditions. This could not be achieved without the above described features.

A further aspect of the invention relates to a refrigerant compressor comprising at least one rolling bearing as described above.

Further advantages and preferred embodiments are disclosed in the claims, the description and the figures. It should be further noted that a person skilled in the art may combine the presented features otherwise than indicated without extending the scope of the invention.

BRIEF DESCRIPTION OF THE SEVERAL VIEWS OF THE DRAWING

In the following, the present invention will be described by means of embodiments shown in the figures. The shown embodiments are exemplarily, only, and are not intended to limit the scope of protection. The scope of protection is solely defined by the attached claims.

The figures show:

FIG. 1: a schematic drawing of a refrigerant compressor comprising a hybrid roller bearing according to a preferred embodiment.

DETAILED DESCRIPTION OF THE INVENTION

In the following same or similar functioning elements are indicated with the same reference numerals.

FIG. 1 shows a sectional view of a refrigerant compressor 1 having an electric motor 2 which drives a shaft 4. The shaft 4 is radially supported by a set of roller bearings, particularly hybrid roller bearings, 10-1, 10-2, which are arranged on both sides of the motor 2. Further, the shaft 4 is axially and radially supported by a plurality of ball bearings, particularly hybrid ball bearings, 20-1, 20-2, 20-3. The ball bearings 20 are preferably angular contact ball bearings, which are enabled to support axial and/or radial forces, but may be any other type of ball bearing. The roller bearings 10 may be any kind of roller bearing, e.g. a cylindrical roller bearing, a spherical roller bearing, a tapered roller bearing or a toroidal roller bearing or combinations thereof.

Each roller bearing 10 comprises an inner ring 12 having a raceway 13, an outer ring 14 having a raceway 15, and rollers 16 having raceways 17, which are arranged therebetween. The rollers 16 are further guided by means of a cage 18, which is preferably made from a glass-fiber enforced PEEK material. However, any other fiber-enforced material e.g. a carbon fiber material, may be used for the cage.

Analogously, each ball bearing 20 comprises an inner ring 22 having a raceway 23, an outer ring 24 having a raceway 25, and balls 26 having surfaces 27, arranged therebetween. Also, the balls 26 are guided by means of a cage 28, which is preferably made from a glass-fiber enforced PEEK material. However, any other fiber-enforced material e.g. a carbon fiber material, may be used for the cage.

Further, it should be noted that the ball bearings shown in FIG. 1, have a contact angle of 25° to 30°, but it is also possible to use ball bearings having contact angles in the range of 0° to 45°. Optionally, the ball bearing 20 has an osculation $\Phi$, which ranges between 1.02 and 1.1, wherein $\Phi$ is defined as $$\Phi = \frac{2r_{i,e}}{D_w},$$

with $r_{i,e}$ being the raceway radius of the inner raceway or the outer raceway, and $D_w$ being the diameter of the ball. The proposed osculation gives a balance between low friction forces at the surface and high contact stresses, so bearing life is optimized.

As is further shown in FIG. 1, the rolling bearings 10, 20 are lubricated by lubrication means 30, 32, which are adapted to provide a lubricant to the rolling bearings 10, 20. Since the device shown in FIG. 1 is a refrigerant compressor, it is preferred to use the refrigerant itself or a refrigerant/oil mixture as lubricant. This has proven to improve heat transfer in the condensers and the evaporator heat exchangers. Eliminating oil lubricant also eliminates the need for oil maintenance and oil cost.

Unfortunately, the used refrigerant, e.g. R134a, R1233zd, R1234ze, or R515B produces a very aggressive environment which results in an increased corrosion risk for the bearings. Consequently, any deteriorating influences to the rolling bearing, even before first use, is to be avoided. Therefore, before first use of the rolling bearing, at least one surface of the rolling bearing is coated with a protective fluid, preferably an oil-based preservative fluid. The protective fluid covers at least one of the functional surfaces of the bearing and protects the bearing from any deteriorating influence and chemical attack. Thereby, the protective fluid ensures that the surface of the bearing is, as much as possible, undamaged before the bearing is used for the first time.

Water/humidity is one of the main reasons for corrosion. In combination with the used refrigerant, water/humidity may generate corrosive elements or other substances which increase the corrosion risk. Consequently, the protective fluid coating may be water/humidity repellent or even hydrophobic, so that water or humidity does not get into contact with the media which is used for lubrication.

The protective fluid itself is a preservative fluid with anticorrosion additives. The anticorrosion additive or the protective fluid is preferably a polar substrate with polar heads and non-polar tails, wherein the polar heads are adapted to bond to the bearing surface and the non-polar tails prevent elements to come into contact with the bearing surface. The polar substances have the further advantage that the physical and chemical properties of the polar substance support that that the protective fluid coating is re-established, in case the coating is washed off the bearing to some extent.

Further, using pure refrigerant and/or a refrigerant/oil mixture as lubricant, leads to ultra-thin lubrications film thickness (UTFT) conditions due to the refrigerant providing an elasto-hydrodynamic lubrication film with a thickness of less than 200 nm, preferably less than 100 nm, most preferred less than 30 nm. Since these applications work with very thin film thicknesses (e.g. less than 200 nm) any solid particle (debris, sand, oil soot, etc.) even the very small ones can produce damage in the contact surfaces and can modify the topography disrupting the film build-up capability of the original surface. Excessive contamination, which is also an issue in refrigerant lubricated rolling bearing, can also generate high friction forces that will hinder/block the rotation of the bearing and can produce fractures in the cage or seizure in the raceways and rolling elements.

Advantageously, the protective fluid coating with anticorrosion additives is left on the bearing in use, as the substances do not react with the media-lubricant/refrigerant. To the contrary, the protective fluid coating may protect the bearing surfaces from the corrosive influence of the refrigerant by maintaining an additional protective coating on the bearing surface, which in turn enhances the bearing performance. A further advantage is that the additional coating may increase the thickness and/or continuity of the lubrication layer in ultra-thin lubrication film applications.

Further, in order to improve the wear and fatigue life of rolling bearings used in the refrigerant compressor, it has already been common knowledge to use a hardened high nitrogen stainless steel, e.g. VC444 steel, and silicon nitride rolling elements for the hybrid rolling bearing.

Additionally, micropitting and corrosion induced wear of a hybrid rolling bearing may be significantly reduced if the roughness of at least one rolling element is significantly higher than the roughness of the remaining rolling elements. The higher Rq2,i roughness value of the at least one rolling element allows for an increased wear when the at least one rolling element with the increase roughness contacts the raceways. Even if increased wear should in generally be avoided, the intended wear smooths out indentations in the raceways which occur during the service life of the bearing. This also reduces the overall corrosion of the bearing and prolongs the service life of the bearing.

The steel used for the rings and the raceway is preferably a hardened corrosion resistant steel, e.g. VC444 steel, another example is DIN X30CrMoN15-1 (AMS 5898). In general the hardened corrosion-resistant bearing steel for UTFT conditions refers to a bearing steel with an after-heat-treatment hardness≥HRC 58 and/or fracture toughness of at least 14 MPa m$^{1/2}$ (ASTM-E399-12). It is further preferred, if the corrosion resistance has a pitting potential bigger or equal to +25 mV higher than the stainless steel reference (AISI 440C) according to ASTM G61-86. After heat treatments the ring raceways 13, 15, 23, 25 are machined to dimensions, and the desired roughness is adjusted. The heat treatment usually comprises one of more of the following steps:

Austenitising at 1000° C. to 1150° C.;

Gas quench;

Subzero treatment at −40° C. to −150° C.;

Tempering to certain temperatures for different dimensional stability properties.

Table 1 shows one example of the covered steel: DIN X30CrMoN15-1 (AMS 5898), compared with the reference steel AISI 440 C. It is further shown that different tempering temperatures give different dimensional stability properties for the same corrosion resistant steel.

TABLE 1

Example of corrosion resistant steel parameters

| Steel | Pitting Potential relative to reference, [mV] | Tempering | Hardness |
|---|---|---|---|
| DIN X30CrMoN15-1 | +25 | At 400° C. to 550° C. | ≥58 HRC |
| DIN X30CrMoN15-1 | +375 | At 150° C. to 240° C. | ≥58 HRC |
| AISI 440C | 0 | Min. of ~204° C. | ≥58 HRC |

Preferably the rolling bearings 10, 20 are hybrid rolling bearings, wherein the rolling elements, namely the rollers 16 and the balls 26, are Silicon Nitride Balls/Rollers (Si3N4): The rolling elements 16, 26 are made by most stringent ceramic quality control and grade and have to pass ASTM F2094 or ISO 26602 class I and II with rolling element grade equal or better than G10.

Besides the roughness difference as mentioned above, the inventors have further found that it is preferred to adjust the combined roughness of raceways and rolling elements of the hybrid rolling bearings 10, 20 used for applications operating under UTFT conditions to predetermined ranges. It has been proven that hybrid rolling bearings 10, 20 having the roughness values as listed below are particularly resistant to corrosion induced wear even in UTFT conditions:

For the hybrid ball bearings 20, the following values apply:

the combined surface RMS roughness Rq of raceways and the remaining balls is $R_q \leq 4 \times 10^{-9}(1000 d_m)^{0.55}$ [meter], and the combined surface RMS roughness Rq of raceways and the at least one ball with the increased roughness is $R_q \leq f^* 4 \times 10^{-9}(1000 d_m)^{0.55}$ [meter], with $2 \leq f \leq 12$, wherein Rq is defined as $R_q = \sqrt{R_{q1}^2 + R_{q2}^2}$;

the combined roughness skewness Rsk of raceways and all balls is $R_{sk} \leq 0$, wherein $R_{sk}$ is defined as $$R_{sk} = \frac{R_{sk1} R_{q1}^3 + R_{sk2} R_{q2}^3}{R_q^3};$$

the combined roughness slope parameter RΔqx of raceways and remaining balls is $R_{\Delta qx} \leq 8$ [mrad], and the combined roughness slope parameter RΔqx of raceways and the at least one ball with increased roughness is $R_{\Delta qx} \leq f^* 8$ [mrad], with $2 \leq f \leq 12$, wherein RΔqx is defined as $$R_{\Delta qx} = \frac{R_{\Delta qx1} + R_{\Delta qx2}}{2}.$$

For the hybrid roller bearings 10, the following values apply:

the combined surface RMS roughness Rq of raceways and the remaining rollers is $R_q \leq 5 \times 10^{-8}(1000 d_m)^{0.2}$ [meter], and the combined surface RMS roughness Rq of raceways and the at least one roller with the increased roughness is $R_q \leq f^* 5 \times 10^{-8}(1000 d_m)^{0.2}$ [meter], with $1.2 \leq f \leq 18$, wherein Rq is defined as $R_q = \sqrt{R_{q1}^2 + R_{q2}^2}$;

the combined roughness skewness Rsk of raceways and all rollers is $R_{sk} \leq 0$, wherein $R_{sk}$ is defined as $$R_{sk} = \frac{R_{sk1} R_{q1}^3 + R_{sk2} R_{q2}^3}{R_q^3};$$

the combined roughness slope parameter RΔqx of raceways and remaining rollers is $R_{\Delta qx} \leq 50$ [mrad], and the combined roughness slope parameter RΔqx of raceways and the at least one roller with increased roughness is $R_{\Delta qx} \leq f*50$ [mrad], with $1.2 \leq f \leq 18$, wherein RΔqx is defined as $$R_{\Delta qx} = \frac{R_{\Delta qx1} + R_{\Delta qx2}}{2}.$$

By providing a rolling bearing with an additional protective fluid coating, a robust operation of rolling element bearings in media lubricated applications may be achieved. Media (refrigerant) lubricated bearings often suffer from being exposed directly to the process media, which in many cases has poor properties as a lubrication and does not prevent or even promotes corrosion. Fluids used in media lubricated applications can be corrosive by themselves or generate corrosive elements in combination with water/humidity, other substances or by aging. The protective fluid (e.g.: preservative including antirust additives) covers the functional bearing surfaces, protects them, and prevents the bearing surfaces from chemical attack. Possible additives contained by the preservative in order to protect the bearing surfaces are overbased sulfonates, amides and imides, and Zn-naphentate. These additives have polar heads which bond to the polar bearing surfaces and non-polar tails which prevent other polar elements to get in contact with the bearing surface.

The protective fluid covering the bearing surfaces should not be removed before mounting the bearing into the application. The specialized bearing treatment allows a reliable operation of rolling element bearings for such demanding applications (stiffness, simplicity, robustness, tight clearances, . . . ).

REFERENCE NUMBERS 1 refrigerant compressor
2 electric motor
4 compressor shaft
5 hybrid roller bearing
12 inner ring of the hybrid roller bearing
13 raceway of the inner ring of the hybrid roller bearing
14 outer ring of the hybrid roller bearing
5 raceway of the outer ring of the hybrid roller bearing
16 roller of the hybrid roller bearing
17 raceway of the roller of the hybrid roller bearing
18 cage of the hybrid roller bearing
20 hybrid ball bearing
22 inner ring of the hybrid ball bearing
23 raceway of the inner ring of the hybrid ball bearing
24 outer ring of the hybrid ball bearing
25 raceway of the outer ring of the hybrid ball bearing
26 balls of the hybrid ball bearing
27 surface of the balls of the hybrid ball bearing
28 cage of the hybrid ball bearing
30, 32 lubrications means

What is claimed is:

1. A rolling bearing comprising:
an inner raceway,
an outer raceway, and
a plurality of rolling elements arranged therebetween, wherein the rolling bearing is media-lubricated or oil-free lubricated, wherein
the lubricant forms an elasto-hydrodynamic lubricant film between the rolling elements and the raceways, wherein
at first use of the rolling bearing, at least one surface of the rolling bearing is coated with a protective fluid, and
wherein the protective fluid is a polar substrate with polar heads and non-polar tails, and wherein the polar heads are adapted to bond to the bearing surface and the non-polar tails prevent elements to come into contact with the bearing surface.

2. The rolling bearing according to claim 1, wherein the protective fluid is water/humidity repellent.

3. The rolling bearing according to claim 1, wherein the rolling bearing is media-lubricated with pure refrigerant or a refrigerant mixture forming the elasto-hydrodynamic lubricant film.

4. The rolling bearing according to claim 1, wherein the rolling bearing is lubricated by means of an ultra-thin lubrication film arranged between the rolling elements and the raceways.

5. The rolling bearing according to claim 4, wherein the ultra-thin lubrication film defines a lubrication film thickness that is less than three hundred nanometers (300 nm).

6. The rolling bearing according to claim 5, wherein the lubrication film thickness is less than one hundred nanometers (100 nm).

7. The rolling bearing according to claim 5, wherein the lubrication film thickness is less than thirty nanometers (30 nm).

8. The rolling bearing according to claim 1, wherein the protective fluid is a preservative fluid with anticorrosion additives.

9. The rolling bearing according to claim 1, wherein the polar substrate is a detergent, a dispersant or an inhibitor.

10. The rolling bearing according to claim 9, wherein the protective fluid comprises at least one of overbased sulfonates, amides, imides and Zn-naphentate.

11. The rolling bearing according to claim 1, wherein at least one rolling element is made from silicon nitride ($Si_3N_4$).

12. The rolling bearing according to claim 1, wherein the rolling elements are guided by means of a cage.

13. The rolling bearing according to claim 12, wherein the cage is made from a fiber-enforced material.

14. The rolling bearing according to claim 12, wherein the cage is made from glass-fiber-enforced PEEK.

15. The rolling bearing according to claim 12, wherein the cage is made from carbon fiber-enforced PEEK.

16. The rolling bearing according to claim 1, wherein the protective fluid is an oil-based preservative fluid.

17. A rolling bearing comprising:
an inner raceway,
an outer raceway, and
a plurality of rolling elements arranged therebetween, wherein the rolling bearing is media-lubricated or oil-free lubricated,
wherein the lubricant forms an elasto-hydrodynamic lubricant film between the rolling elements and the raceways,
wherein at first use of the rolling bearing, at least one surface of the rolling bearing is coated with a protective fluid, and wherein at least one raceway is made from a hardened corrosion-resistant steel, having a corrosion resistance with a pitting potential of at least 25 mV higher than the stainless steel reference (AISI 440C) according to ASTM G61-86.

18. The rolling bearing according to claim 17, wherein the protective fluid is a polar substrate with polar heads and non-polar tails, and wherein the polar heads are adapted to bond to the bearing surface and the non-polar tails prevent elements to come into contact with the bearing surface.

19. A media lubricated machine comprising at least one rolling bearing:
- an inner raceway,
- an outer raceway, and
- a plurality of rolling elements arranged therebetween, wherein the rolling bearing is media-lubricated or oil-free lubricated, wherein
- the lubricant forms an elasto-hydrodynamic lubricant film between the rolling elements and the raceways, and wherein
- at first use of the rolling bearing, at least one surface of the rolling bearing is coated with a protective fluid and
- wherein the protective fluid is a polar substrate with polar heads and non-polar tails, and wherein the polar heads are adapted to bond to the bearing surface and the non-polar tails prevent elements to come into contact with the bearing surface.

20. The media lubricated machine according to claim 19, wherein the protective fluid is an oil-based preservative fluid.

* * * * *